3,075,926
FOAMED POLYURETHANE PLASTICS AND
PROCESS FOR MAKING SAME
William D. Stewart, Alexandria, Va., and Richard O. Thomas, Washington, D.C., assignors to Atlantic Research Corporation, Alexandria, Va., a corporation of Virginia
No Drawing. Filed May 15, 1959, Ser. No. 813,334
30 Claims. (Cl. 260—2.5)

This invention relates to rigid, expanded polyurethane plastics, which are particularly suitable for use as energy-absorbent and heat insulating materials and which can be foamed in place directly from monomeric components without an accessory source of heat.

An important area of use for cellular structures is as energy-dissipating material for the protection of supplies and equipment delivered by aerial drop. Increasing the energy-absorptive properties of the protective foam increases the altitude from which packages can be dropped and their rate of descent. This reduces hazard to personnel and aircraft during delivery, decreases the size of parachute required for drag and stabilization of the packages during fall, and increases accuracy in placing dropped material.

Since the low-density cellular structures are exceedingly bulky, transportation to the area of use is not only expensive but can be a serious, if not insoluble, problem under urgent field conditions. It is, therefore, not only desirable, but in many cases essential that the cellular protective material be quickly and easily preparable in the field in a single operation under ambient temperature conditions from relatively low cost, stable components, without requiring special equipment or accessory treatments other than mixing, such as heating. It is also important that the cellular product attain quickly the requisite energy-absorptive properties with a minimum of curing time.

To be suitable, the cellular material must crush upon impact without bounce, thereby dissipating energy without any destructive transmittal to the cushioned package. The protective structure must, therefore, be rigid and non-resilient. Cellular material such as foamed glass and aluminum honeycomb possess good energy-dissipating properties, but the serious disadvantage of not being preparable at the point of use. Foamed plastics have hitherto proven unsatisfactory for such reasons as excessive resilience, heating requirements for polymerization, curing or foaming which are difficult to meet in the field, the short shelf life of reaction components, such as polyurethane prepolymers, and excessive cost.

The object of this invention is to provide rigid, non-resilient cellular polyurethane plastics which can be foamed in place by the reaction of monomeric components in a single operation under ambient temperature conditions without requiring an accessory source of heat.

Another object is to provide rigid, foamed polyurethane plastics which are excellent energy-absorptive materials because of their non-resilience and crushability under impact.

Still another object is to provide rigid cellular polyurethane plastics which can be foamed in place and cure, without external heating, to the desired rigidity and crushability within a very short time.

Yet another object is to provide rigid, highly energy-absorptive, foamed polyurethane plastics which also have excellent heat-insulative properties.

Other objects and advantages will become obvious from the following detailed description.

We have discovered that rigid, highly energy-absorptive, foamed polyurethane plastics can be prepared by admixing a polyhydroxy alcohol ester of ricinoleic acid containing at least two ricinoleyl groups and having an equivalent weight in terms of its functional hydroxy groups above 200, a polyol containing at least 3 hydroxy groups and having a maximum equivalent weight in terms of its functional hydroxy groups of about 125, preferably a maximum of about 100; a polyisocyanate; a polymerizable, ethylenically-unsaturated monomer containing at most one functional hydroxy group; and a foaming agent, such as water or a carboxylic acid, which produces $CO_2$ by reaction with the polyisocyanate. The reaction mixture may also include a catalyst to promote reaction of the high molecular weight polyricinoleate polyol with the polyisocyanate; an emulsifying agent as a dispersing and solubilizing agent for the water; and a foam stabilizer.

The reaction mixture should not contain a catalyst, such as an organic peroxide, which promotes polymerization of the ethylenically-unsaturated monomer. Such catalysts have hitherto been employed in the art, including the polyurethane art, to induce unsaturated monomer polymerization. Their use is objectionable for our purpose, however, since the foamed polyurethane products are excessively resilient, apparently because the catalyst free radicals tend to cause termination of the polymerization reaction at relatively low molecular weight levels and to promote linear polymerization of the unsaturated, non-polyol monomer rather than cross-linkage at the unsaturated sites in the polyricinoleate polyol, which we believe is essential for foam rigidity and non-resilience.

Upon mixture of the aforedescribed components at ambient temperature, reaction takes place very rapidly. Polymerization, foaming, and curing proceed and are completed under the exotherm of the reaction mixture without requiring accessory heating. Foaming expansion occurs within minutes and substantially maximum strength and rigidity of the foamed plastic are generally reached within 12 hours or less.

The di- and tri-ricinoleic acid (12-hydroxy-9-octadecanoic acid) esters are particularly suitable for our purpose because the double bonds at the ninth carbons of the acyl groups provide sites for cross-linking and chain extension which, under the conditions of our process, yield highly cross-linked, three-dimensional, rigid polyurethane polymers. The ricinoleic acid esters can be the diesters of a polyhydric alcohol, such as a glycol, e.g. ethylene glycol, propylene glycol, butylene glycol; a polyglycol, e.g. di-, tri-, and tetra-ethylene or propylene glycol; glycerol; and the like. Such ricinoleic acid esters are characterized by a high equivalent weight, generally above 200, in terms of hydroxy functionality.

We prefer to employ castor oil because of its high ricinoleic acid ester content combined with its availability and low cost. Castor oil is a triglyceride of 18-carbon fatty acids generally consisting of about 90% hydroxy acids, practically all ricinoleic, and about 10% non-hydroxy acids, chiefly oleic and linoleic. The oil consists of about 70% of trihydroxy ester, glyceryl triricinoleate, and about 30% of dihydroxy ester, glyceryl diricinoleate monooleate or glyceryl diricinoleate monolinoleate. In terms of isocyanate functionality, it is, therefore, about 70% tri-functional and 30% di-functional. Although non-functional relative to the isocyanate, the oleic and linoleic acid components advantageously provide unsaturated sites for cross-linkage and chain extension.

We are aware that castor oil has been employed with diisocyanates to form polyurethanes. Such polymers, however, are excessively resilient for energy-absorptive purposes. Because of the secondary nature of the hydroxyl groups, combined with the high equivalent weight in terms of hydroxy or isocyanate functionality (about 340), castor oil reacts very slowly with diisocyanate at room temperature, even in the presence of catalysts, so that accessory heating is required. The polymerization reaction must be sufficiently rapid to provide an adequately retentive structure to hold within the body of the mass the $CO_2$ gas formed by isocyanate reaction with water.

A liquid polyol having at least 3 functional hydroxyl groups, preferably 4, and a maximum equivalent weight in terms of hydroxy (and, therefore, isocyanate) functionality of about 125, preferably 100, reacts rapidly with a polyisocyanate at ambient temperature with concomitant high exotherm. Examples of such highly reactive liquid polyols include N,N,N',N'-tetrakis-(2-hydroxypropyl) ethylene diamine (Quadrol), glyceryl monoricinoleate, triethanol amine, glycerol, hexanetriol, and the like. Addition of such polyol derivatives to the polyricinoleate-polyisocyanate system provides the requisite rapid temperature build-up for complete and fast reaction of the polyricinoleate hydroxyl groups with the diisocyanate and the foaming reaction with water. Such co-condensation provides an expedient for eliminating the need for accessory heating. The cured, foamed product, however, is resilient and does not, therefore, possess the desired high energy-absorptive properties without bounce.

We have discovered that the desired foam rigidity and crushability under impact can be achieved by including a liquid, polymerizable, ethylenically-unsaturated monomer, having no or at most one reactive hydroxyl group, into the polyisocyanate reaction system and initiating polymerization of the unsaturated monomer by thermal induction of free radicals without accessory use of a catalyst, such as an organic peroxide, generally employed to promote such polymerization. We have additionally found that the requisite heat for such thermal induction can be provided by the high exotherm produced by reaction with the polyisocyanate of the aforedescribed polyol having at least 3 and and preferably 4 functional hydroxy groups and a maximum equivalent weight in terms of hydroxy functionality of about 125, preferably 100.

Such thermal polymerization of the unsaturated, non-polyol monomer yields foamed copolymers having considerably better physical properties for our purpose at the temperatures required for rapid condensation of the polyricinoleic acid ester, such as castor oil, with polyisocyanate than those obtained with the aid of peroxide free radicals. The foamed products obtained under our thermally induced processing conditions are also considerably more rigid and energy-absorptive than foams made by reaction of prepolymer castor oil-diisocyanate or polyester-diisocyanate adducts with a peroxide-catalyzed, unsaturated, non-polyol monomer and water. The thermal conditions of our process apparently promote cross-linking copolymerization of the unsaturated, non-polyol monomer with the polyricinoleate at its double bond sites, thereby producing a highly rigid, crushable foam.

The unsaturated, non-polyol monomers provide the additional important advantage of dissolving in and, thereby, depressing the solidification temperature of the polyisocyanate. It is essential that the reagent components be in liquid state for rapid reaction. Many of the diisocyanates solidify at temperatures, which, while in the normal ambient temperature range, would excessively slow up the reaction at low temperatures, e.g. below 40° F. For example, the 65:35 mixture of the 2,4- and 2,6-isomers of toluene diisocyanate solidifies at 5° C., the 80:20 mixture at 12° C., and the 100% 2,4-isomer at 22° C. Depression of the solidification point by the unsaturated, non-polyol monomer thus increases the lower range of ambient temperature at which the reaction components can effectively react and cure. Vinyl toluene, for example, in adequate amounts can be used to reduce the solidification point of the 80/20, 2,4-/2,6-mixture of toluene diisocyanate to as low as −28° C.

Illustrative examples of suitable polymerizable, ethylenically-unsaturated, non-polyol monomers include: styrene, vinyl toluene, ethyl acrylate, butyl acrylate, 2-ethyl-hexyl acrylate, methyl methacrylate, ethyl methacrylate, diethylene glycol dimethacrylate, tetraethylene glycol dimethacrylate, diallyl succinate, dimethyl maleate, diallyl maleate, vinyl acetate, vinyl stearate, diallyl phthalate, methyl butenol, divinyl benzene, triallyl cyanurate, N,N-diallyl melamine, and the like. We have found the vinyl monomers, such as vinyl toluene, diallyl stearate, diallyl phthalate, N,N'-diallyl melamine, and triallyl cyanurate, to be particularly suitable.

Substantially any reactive polyisocyanate can be employed for our purpose, including aliphatic diisocyanates, such as hexamethylene diisocyanate, and aromatic polyisocyanates, such as 2,4-tolylene diisocyanate, mixtures of 2,4-tolylene diisocyanate and 2,6-tolylene diisocyanate, m-phenylene diisocyanate, 3,3'-bitolylene-4,4'-diisocyanate, diphenylmethane-4,4'-diisocyanate, dianisidine diisocyanate, 1,5-naphthalene diisocyanate, tri-(p-isocyanylphenyl) methane, the triisocyanate adduct formed by reaction of 1 mol of hexanetriol and 3 mols of m-tolylene diisocyanate, and the like. The particular polyisocyanate selected is determined to a considerable extent by its reaction rate in a given monomer reaction system. This, together with suitable selection of the highly reactive polyol employed in conjunction with the polyricinoleate, provides an additional element of control over the exotherm of the reaction. Thus, in a highly reactive system, the use of a somewhat less reactive aliphatic diisocyanate, such as hexamethylene diisocyanate would be advantageous to prevent excessive exotherm or to prevent excessive hardening of the polymeric structure before good cell formation is obtained. In general, we prefer to employ the aromatic diisocyanates because of their more rapid reaction rates, and, in particular, 2,4- or a mixture of 2,4- and 2,6-tolylene diisocyanate, because of its excellent performance, availability and low cost. The triisocyanate adduct of hexanetriol and tolylene diisocyanate is particularly suitable for use under low temperature conditions, e.g. 0° C., because of its low solidification point.

The foaming component can be water, a carboxylic acid which is soluble in the polyisocyanate reaction component, or a mixture of both. Although water is, in general, preferred, good foaming can be obtained with carboxylic acids, preferably of low molecular weight, such as acetic acid, propionic acid, lactic acid, β-hydroxy-propionic acid and the like. Use of such acid foaming agents, either alone or in combination with water provides an additional means for controlling reaction temperatures.

It is conventional practice to speed up the rate of reaction of a relatively slowly reactive polyol, such as castor oil or a polyester, with the polyisocyanate by means of a catalyst, such as an amine, preferably a tertiary amine, e.g. n-methyl morpholine, or triethyl amine, or metal salts, e.g. iron acetyl acetonate, lead naphthenate, cobalt naphthenate, zinc stearate, tributyl tin methacrylate, dibutyl tin dilaurate, dibutyl tin oxide, sodium stearate, sodium ricinoleate, sodium salicylate, sodium sitrate, or the like. Although, in general, such catalysis is a function of basicity of the reaction mixture, with inorganic acids acting as inhibitors, Lewis acids, such as trimethyl boron, have catalytic activity.

Catalysts, as aforedescribed can advantageously be employed with the reaction components of our invention, but are not always essential, since the rapid exotherm provided by the highly reactive polyol, containing at least 3 hydroxyl groups and having a maximum equivalent weight in terms of hydroxy functionality of 125, may of itself be adequate to promote the desired rate of reaction of the less reactive polyricinoleate polyol. Selection of a highly reactive basic polyol, such as Quadrol or triethanolamine also eliminates the need for an additional catalyst, since the basicity of the polyol provides the desired catalytic activity. In other instances, basic impurities present in a commercially available polyol, such as glyceryl monoricinoleate, resulting from its method of preparation, provides an adequate catalytic effect.

It is generally desirable, though not always essential, to follow the conventional practice of including an emulsifier as a dispersing and solubilizing agent for the water foaming component since water and most polyisocyanates are relatively immiscible and may, therefore, react too slowly. The emulsifier can be dispensed with if other components, such as the highly reactive polyol or the foam stabilizer, also possess surface-active characteristics. Where an organic acid soluble in the other reaction components is used for foaming there is no need for an emulsifier. Any suitable emulsifying agent can be employed for our purpose, such as polyoxyethylated vegetable oils, polyglycol esters of fatty acids, polyglycol aryl and higher fatty alcohol ethers, alkyl aryl sulfonates, dialkyl sulfosuccinates, petroleum sulfonates, higher fatty acid soaps and sulfated fatty acid soaps, etc.

Foam stabilizers can also advantageously be included in our reaction mixtures to improve uniformity and fineness of pore size. Any of the well known foam stabilizers, such as polyvinyl chloride, ethyl cellulose, cellulose acetate, cellulose acetate-butyrate, silicone oils, e.g. polydimethyl siloxane, polyvinyl alcohol, polyvinyl methyl ether-maleic anhydride, casein and, gum arabic, can be employed. Ethyl cellulose, polyvinyl chloride, and the silicone oils and copolymers are particularly effective for our purpose.

Finely-divided pigments and fillers, such as calcium carbonate, calcium sulfate, calcium oxide, aluminum, aluminum oxide, carbon black, and the like, can also be incorporated if desired for special applications.

The amounts of the various components used will, of course, vary considerably, depending upon such factors as the reactivity of the specific reagents and the particular physical characteristics desired in the cured foam, such as density.

In general, it will be necessary to include at least about 10% of the highly reactive polyol by weight of the polyricinoleate and, preferably, at least about 20%, to obtain an adequate exotherm for reaction at ambient temperature. Since the non-polyricinoleate polyol reacts with the polyisocyanate to form a polyurethane, there is no critical upper limit of amount except that dictated by the need to avoid an excessive exotherm which might cause charring, and the desirability of having sufficient of the polyricinoleate polyol to provide adequate crosslinking with the unsaturated non-polyol monomer for foam rigidity. These factors will, of course, vary with the particular polyols, both highly reactive and polyricinoleate, the particular unsaturated, non-polyol monomer, the particular polyisocyanate, etc. In general, preferred maximum ratios by weight of highly reactive polyol to polyricinoleate is about 2:1 or 3:1, and the minimum weight concentration of the polyricinoleate in the reaction composition is about 10%.

The foaming component, water or carboxylic acid, is employed in minor amounts, which are determined largely by the desired foamed product density. The specific quantity is also a factor of the equivalent weight of the particular compounds in terms of its functional groups reactive with isocyanate. In the case of water, the equivalent weight is 9, since it reacts with an isocyanato group to form $CO_2$ and a highly reactive primary amine, which in turn reacts with another isocyanato group to form a urea linkage with resultant cross-linking. The equivalent weights of carboxylic acids are, of course, higher because of the higher molecular weights of such compounds. Reaction of an isocyanato group with the carboxyl group of an acid, produces $CO_2$ and an amide, which, though considerably less reactive than an amine, can also react with an isocyanato group to give cross-linking. The requisite quantity of foaming agent required to produce the desired density for a particular foamed product can readily be determined by routine experimentation.

The ratio of isocyanto groups to functional hydroxyl groups in the reaction mixture, e.g. polyricinoleate, highly reactive polyol, water, carboxylic acid, can be as low as about 0.5:1. Rigidity and substantial non-resilience are obtained even at such relatively low concentrations of isocyanate because of the cross-linking provided by the unsaturated, non-polyol monomer. Ratios less than 1 of isocyanato groups to hydroxyl groups are advantageous in the production of high density foams, where the rate of heat dissipation during reaction is relatively slow, so that excessive temperatures which may cause charring and decomposition cannot develop within the foaming structure. Reduction in isocyanate concentration can be employed as an expedient for reducing reaction exotherm.

For relatively low density foams, maximum rigidity, and non-resilience, it is generally preferable that the number of isocyanato groups contributed by the polyisocyanate be at least equivalent to the total number of functional hydroxyl groups. Preferably also, some excess polyisocyanate is included to provide for cross-linkage through urea groups. The amount of such excess will, of course, be largely determined by the number of such groups formed in the reaction, which in turn is determined by the relative amounts of components such as water or amine catalyst present in the reaction mixture. In general, the practical maximum excess of isocyanato groups over functional hydroxyl groups in about 20%.

The polymerizable, non-polyol, ethylenically-unsaturated, monomer should comprise at least about 5%, preferably 10%, by weight of the polyricinoleate.

The amounts of other minor conventional additives, such as foam stabilizer, emulsifying agent and catalyst for the polyol-isocyanate reaction, are determined by the properties of the specific additive and the desired foamed plastic characteristics, such as size of cell. The optimum amounts for particular applications can readily be determined by those skilled in the art.

The reaction components, including the unsaturated non-polyol monomer if properly inhibited by conventional means, are stable and can be stored prior to use for extensive periods of time without deterioration.

The components of the reaction mixture can be hand- or machine-mixed at ordinary temperature in any desired sequence, except that the polyisocyanate is added last. In many cases, it may be desirable to combine the polyisocyanate and the ethylenically-unsaturated, non-polyol monomer prior to storage for eventual use in the foamed resin-forming reaction to reduce the solidification temperature of the polyisocyanate and, thereby, to maintain its fluidity under conditions of low ambient temperature. The blended mixture is poured into place, where it foams and cures under its own reaction exotherm. Curing is generally substantially complete within a matter of hours.

The rigid, cured foams are substantially non-resilient, namely, crush under impact without bounce so that they can absorb all impact energy without transmittal to cushioned supplies. They can be made in a wide range of density, e.g. from about 1.5 to 30 lbs./cu. ft., by variation in concentration of the foaming component. In general, the higher the density, the greater is the energy-absorptive capacity. Foamed polyurethanes having substantially the energy-dissipating characteristics of foamed glass have been prepared by our process.

In addition to their unique energy-absorptive properties, our foamed polyurethane products possess superior insulation and strength characteristics, which make them very useful wherever such properties are essential or desirable, with the important additional advantage of being foamable-in-place without heating or other treatment.

Foamed products have been made according to our process having thermal conductivities in the range of 0.25 to 4.0 B.t.u./hr./ft.² in. ° F. over the density range of 2.4 to 6.6 lbs./ft.³. Such low thermal conductivities make them excellent insulating materials. The high mechanical strength of the foamed plastics also makes them excellent reinforcing and load supporting components where light weight is essential, as in airplane parts. The higher density foams are particularly suitable for such purpose. The pour-in-place reaction mixtures can also be employed in potting operations to cushion delicate components against vibrational or corrosive damage and to serve as a dielectric.

EXAMPLE 1

This illustrates the relative reaction exotherm of a polyricinoleate, such as castor oil, and a highly reactive polyol, such as Quadrol, with polyisocyanate.

A. Castor oil and tolylene diisocyanate (Nacconate 80; 80:20 mixture of 2,4- and 2,6-isomers), in 1:1 equivalent ratio, were combined with and without catalysts at 23° C. The castor oil, in the absence of catalyst, reacted very slowly and did not gel after standing over night at room temperature. Addition of catalysts, such as zinc stearate, n-methyl morpholine, triethylamine, sodium tartrate, sodium stearate, sodium salicylate and sodium citrate, increased reaction rate and exotherm to some extent, but the best of these catalysts, triethylamine, increased temperature to a maximum of 56° C.

B. Quadrol admixed with an equivalent weight of tolylene diisocyanate, without catalyst, reacted to give a temperature of 195° C. in 5.5 minutes.

EXAMPLE 2

The following components were mixed at room temperature in the order as given.

T62A:                                              Grams
   Quadrol _____ 30.0
   Castor oil _____ 20.0
   Styrene _____ 10.0
   Ethyl cellulose N-100, 86 cps_____ 3.0
   Water _____ 0.25
   Emulsifier comprising polyoxyethylated vegetable oil _____ 0.20
   Nacconate 80 _____ 43.7

Foaming began within a few seconds; maximum foam rise was completed within about 1 minute; and cure was substantially complete in about 12 hours. The resulting foamed product was strong, rigid and non-resilient.

EXAMPLE 3

Rigid, non-resilient foams were prepared by a method substantially as described in Example 2, employing the following base formulation and varying the polymerizable, unsaturated, non-polyol monomer.

Gm.
Quadrol _____ 60.0
Castor oil _____ 40.0
Emulsifier comprising sulfonated petroleum oils___ 4.0
Ethyl cellulose_____ 6.0
Water _____ 0.5
Nacconate 80 _____ 87.4

| Recipe No. | 20 grams of following added to control recipe | Density | Foam characteristics |
|---|---|---|---|
| 98B | Methyl methacrylate | 2.36 | Brittle, large cells. |
| 99A | Ethyl methacrylate | 2.44 | Do. |
| 99B | Diallyl succinate | 4.42 | Very uniform cells, hard, strong, brittle. |
| 99C | Ethyl acrylate | 2.26 | Brittle, large cells. |
| 99D | N-butyl acrylate | 3.14 | Non-uniform, brittle. |
| 100C | Diallyl phthalate | 5.25 | Uniform small cells, very strong. |
| 100D | Triallyl cyanurate | 6.26 | Uniform, tough, small cells, brittle. |
| 91C [1] | Styrene | 5.0 | Hard, brittle, large. |

[1] 96.1 gm. Hylene TM (tolylene diisocyanate, 80/20, 2,4-/2,6-isomers) substituted for Nacconate 80.

EXAMPLE 4

Rigid, non-resilient foams were prepared substantially as described in Example 2, employing the following base formulation and varying the amount of water, the emulsifier and the unsaturated, non-polyol monomer.

Gm.
Quadrol _____ 60.0
Castor oil _____ 40.0
Ethyl cellulose_____ 6.0
Water _____ [1] 0.5
Emulsifier _____ Variable
Monomer _____ Variable
Nacconate 80 _____ 87.4

[1] A small amount of water additionally present in emulsifier B.

| Sample No. | Monomer | Gms. | Emulsifier gm. A[1] | Emulsifier gm. B[2] | Density lb./ft.³ | Properties of foam |
|---|---|---|---|---|---|---|
| 108B | Diallyl maleate | 20 | 4 | --- | 5.21 | Uniform. |
| 109C | Dimethyl maleate | 20 | 4 | --- | 3.28 | Tough, uniform cells. |
| 109B | 2-ethyl hexyl acrylate | 20 | 4 | --- | 4.09 | Tough, dead cells. |
| 119A | Tetraethyleneglycol dimethacrylate | 20 | 4 | --- | 6.16 | Small, uniform cells, tough, dead. |
| 119D | Divinyl benzene 50-60% | 20 | --- | 4 | 4.10 | Irregular cells, brittle. |
| 113B | Vinyl stearate | 20 | 4 | --- | 6.30 | Very tough, uniform cells. |
| 111B | Diethyleneglycol dimethacrylate | 20 | 4 | --- | 5.40 | Uniform, tough. |
| 111C | Diethyleneglycol dimethacrylate / Vinyl Toluene | 5 / 15 | 4 | --- | 5.10 | Very uniform cells, tough, dead. |
| 122D | Diethyleneglycol dimethacrylate / Vinyl Toluene | 15 / 5 | --- | 4 | 4.66 | Tough cells, uniform. |
| 122C | Diethyleneglycol dimethacrylate / Methyl butenol | 10 / 10 | --- | 4 | 2.62 | Large cells, brittle. |
| 108C | Vinyl toluene | 20 | 4 | --- | 4.46 | Uniform cells, tough, dead. |
| 118B | Diallyl phthalate | 20 | --- | 4 | 4.98 | Cells uniform, small, dead, tough. |
| 117A | do | 20 | 4 | --- | 4.48 | Very small cells, fairly tough, dead. |
| 125B | Methyl butenol | 10 | 4 | --- | 3.51 | Dead, brittle, uniform. |
| 121B | do | 10 | 4 | --- | 3.09 | Uniform cells, brittle. |
| 125A | N,N'-diallylmelamine | 20 | 4 | --- | 4.58 | Tough, brittle uniform cells. |
| 121A | do | 20 | --- | 4 | 4.90 | Uniform, small cells (crunchy). |
| 125C | N,N'-diallylmelamine / Methyl butenol | 5 / 5 | 4 | --- | 4.15 | Small, uniform cells, dead, brittle. |
| 122F | N,N'-diallylmelamine / Diethylene glycol dimethacrylate | 10 / 10 | --- | 2.5 | --- | Very dense, uniform. |
| 122A | N,N'-diallylmelamine / Dimethylene glycol dimethacrylate | 10 / 10 | --- | 4 | 3.77 | Dead, brittle. |

[1] Containing sulfonated petroleum oils.
[2] Containing sulfated monoglyceride of coconut fatty acids.

EXAMPLE 5

The following tests illustrate the effect of varying the amount of water and compensating toluene diisocyanate on foam density.

Formulation 108C:

| | Gms. |
|---|---|
| Quadrol | 60.0 |
| Castor oil | 40.0 |
| Vinyl toluene | 20.0 |
| Emulsifier containing sulfonated petroleum oils | 4.0 |
| Ethyl cellulose (N-100) | 6.0 |
| Water | Variable |
| Toluene diisocyanate (Nacconate 80) | Variable |

| Modification | | Foam density (lbs./cu. ft.) |
|---|---|---|
| Water, gms. | TDI, gms. | |
| 0.5 | 87.0 | 7.6 |
| 0.75 | 89.4 | 6.2 |
| 0.90 | 90.8 | 5.5 |
| 1.00 | 91.8 | 4.5 |
| 1.20 | 93.3 | 4.8 |
| 1.40 | 95.7 | 3.9 |

Formulation 100C:

| | Gms. |
|---|---|
| Quadrol | 60.0 |
| Castor oil | 40.0 |
| Diallyl phthalate | 20.0 |
| Emulsifier containing sulfonated petroleum oils | 4.0 |
| Ethyl cellulose (N-100) | 6.0 |
| Water | Variable |
| Nacconate 80 | Variable |

| Water, gms. | TDI, gms. | Foam density (lbs./cu. ft.) |
|---|---|---|
| 0.5 | 87.0 | 7.95 |
| 0.8 | 88.5 | 6.06 |
| 1.0 | 89.5 | 5.20 |
| 1.2 | 90.4 | 4.62 |
| 1.4 | 91.4 | 4.12 |
| 1.7 | 92.8 | 3.29 |

EXAMPLE 6

The following illustrates the formulation of rigid, very low density foams having densities of 2.5–3.0 lbs./cu. ft. and energy-absorption values of 30–45 in.–lbs./in.$^3$ of crushed volume:

| | Grams |
|---|---|
| Quadrol | 60.0 |
| Castor oil | 40.0 |
| Vinyl toluene | 20.0 |
| Sulfated monoglyceride of coconut fatty acid | 2.0 |
| Glyceryl monoricinoleate | 8.5 |
| Triethylamine | 0.5 |
| Ethyl cellulose (N-100) | 6.0 |
| Water | 1.0 |
| Nacconate 80 | 99.6 |

EXAMPLE 7

A rigid, non-resilient foam of excellent uniform cell structure and a density of 3.9 lbs./cu. ft. was prepared by mixing 60.0 gm. Quadrol, 40.0 gm. castor oil, 20.0 gm. N,N'-diallyl melamine, 6 drops Union Carbide XL-520 (a water-soluble organo-silicone copolymer which functions both as a dispersing agent and foam stabilizer), 1.7 ml. water and 55 ml. Nacconate 80.

EXAMPLE 8

A rigid, non-resilient, high-density foam was prepared by combining the following components:

| | Gm. |
|---|---|
| Quadrol | 270.0 |
| Castor oil | 180.0 |
| Diallyl phthalate | 90.0 |
| Emulsifier containing sulfated petroleum oils | 18.0 |
| Water | 2.5 |

3 g. of ethyl cellulose and 3 g. of N-methyl morpholine were blended with 95 g. of the above mix. This mixture was poured into a vessel containing 75 g. of Nacconate 1080H (the triisocyanate adduct of 1 mol of hexane triol and 3 mols of toluene diisocyanate) with vigorous stirring. The resulting rigid foamed product had a density of approximately 10.5 lbs./ft.$^3$ and could support a load in excess of 200 p.s.i.

EXAMPLE 9

62.2 gms. of a 3:2:1 mixture by weight of Quadrol, castor oil and diallyl phthalate were admixed with 1.5 gms. of ethyl cellulose, 1.0 gm. of lactic acid (85%) and 0.5 gm. of water. To this was added 74 gms. Nacconate 1080H. The resulting, uniformly-celled foam was rigid and non-resilient and had a density of 5.6 lbs./cu. ft.

EXAMPLE 10

The following formulation, employing a reduced concentration of isocyanate and no emulsifier, produced a strong, rigid, substantially non-resilient foam, having a density of 7.03–8.19 lbs./cu. ft.

| | Gms. |
|---|---|
| Quadrol | 60 |
| Castor oil | 40 |
| Diallyl phthalate | 20 |
| Ethyl cellulose (86 cps.) | 3 |
| Water | 0.85 |
| Nacconate 80 | 54.3 |

EXAMPLE 11

A high density foamed product having a density of 27.80 lbs./cu. ft. was prepared employing the formula of Example 9 except that no water was added other than that present in the reacting components. The rigid, non-resilient foamed plastic was tested on a Tinius-Olsen machine, a device for measuring compressive strength. The plastic withstood, without crushing, the maximum pressure which could be exerted by the machine and which, for the particular dimensions of the test sample, was 809.7 p.s.i.

Many foamed samples were tested for energy-absorptive capacity and resiliency by means of a drop-tester in which an adjustable hammer weight was dropped through a maximum distance of 13¼ ft. on a sample 4″ by 4″ in cross-section. Some of the illustrative data obtained in this manner is given in the following table. Sample formulation is given by code number cited above or in footnote. Variations in sample densities for a given formulation were produced either by some variation in amount of water foaming agent or differences in ambient initiation temperatures. The samples, except for commercial samples or as noted, were tested when about 2 weeks old.

It will be noted that the foamed samples, T63C, T38C, and 93D, which were not copolymerized with unsaturated, non-polyol monomer, were resilient, as indicated by the substantial hammer bounce. A foamed polyurethane made with polyester prepolymer, 117B, and commercial styrofoam were also resilient. Foamed polyurethanes made according to our invention have energy-absorptive properties equivalent to that of higher-density foamed glass.

Table I

| Foam formula | Sample density (lbs./ft.³) | Impact energy* per vol. crushed (in.-lbs./in.³) | Impact velocity (ft./sec.) | Hammer bounce (in.) |
|---|---|---|---|---|
| T62A | 5.50 | 67 | 29 | 0.2 |
|  | 5.76 | 81 | 29 | 0.2 |
|  | 6.36 | 94 | 29 | 0.2 |
|  | 4.58 | 59 | 20 | 0.2 |
| T63C [1] | 3.18 | 72 | 21 | 2.0 |
|  | 2.98 | 86 | 21 | 1.6 |
|  | 3.40 | 62 | 25 | 1.0 |
| 100D | 7.08 | 176 | 29 | 0.2 |
|  | 6.66 | 140 | 29 | 0 |
|  | 6.36 | 115 | 29 | 0 |
| Honeycomb paper | 2.4 | 51 | 25 | 0.4 |
|  | 2.4 | 51 | 20 | 0 |
|  | 2.4 | 56 | 16 | 0 |
|  | 2.4 | 43 | 23 | 0.2 |
| Styrofoam | 1.56 | 70 | 29 | 6.0 |
|  | 2.76 | 119 | 29 | 5.0 |
| T38C [2] | 2.87 | 77 | 29 | 3.6 |
|  | 2.97 | 50 | 29 | 1.6 |
|  | 2.89 | 47 | 29 | 2.4 |
|  | 3.12 | 52 | 29 | 2.0 |
| 91C | 3.95 | 60 | 14 | 0 |
|  | 4.13 | 74 | 11 | 0 |
| 108C 1 day old | 4.92 | 96 | 29 | 0.2 |
|  | 5.05 | 100 | 29 | 0.5 |
|  | 5.08 | 103 | 29 | 0.5 |
|  | 5.14 | 98 | 29 | 0 |
|  | 5.20 | 113 | 29 | 0.4 |
|  | 5.24 | 110 | 29 | 0.5 |
| 108C 13 days old | 4.84 | 102 | 29 | 0 |
|  | 4.98 | 100 | 29 | 0 |
|  | 5.07 | 110 | 29 | 0.5 |
|  | 5.23 | 119 | 29 | 0 |
|  | 5.36 | 148 | 29 | 0 |
| 113B | 8.08 | 159 | 25 | 0 |
|  | 8.13 | 168 | 25 | 0 |
| 117B [3] | 2.08 | 110 | 29 | 4 |
|  | 2.23 | 98 | 29 | 6 |
|  | 1.98 | 92 | 29 | 6 |
| 120A1 [4] | 7.02 | 115 | 29 | 0 |
| 120A2 [5] | 6.31 | 77 | 24 | 0 |
| Glass foam | 8.36 | 226 | 29 | 0 |
|  | 8.36 | 185 | 29 | 0 |
| Al honeycomb ⅜″ Hexcel | 2.29 | 108 | 25 | 0 |
|  | 2.28 | 104 | 25 | 0 |
|  | 2.18 | 109 | 25 | 0 |
|  | 2.24 | 109 | 25 | 0 |
| 93D [6] | 4.07 | 120 | 25 | 2-3 |
| 100C | 5.80 | 176 | 29 | 0 |
|  | 5.56 | 143 | 29 | 0 |
|  | 4.62 | 116 | 25 | 0.2 |
|  | 5.57 | 159 | 29 | 0 |
| 99B | 3.85 | 82 | 29 | 0 |
|  | 3.39 | 51 | 20 | 0.2 |
|  | 5.86 | 177 | 29 | 0.1 |
|  | 6.25 | 196 | 29 | 0.2 |
|  | 6.33 | 196 | 29 | 0 |

*Impact energy calculated as product of hammer weight and height.

[1] No unsaturated, non-polyol monomer. Quadrol 25 g., castor oil 75 g., ethyl cellulose 7.5 g., water 0.63 g., emulsifier-poly-oxyethylated vegetable oil 0.509, TDI (100% 2,4) 70 g.
[2] No unsaturated, non-polyol monomer. Castor oil 30 g., glyceryl monoricinoleate 3 g., ethyl cellulose 2 g., water 0.25 g., emulsifier-poly-oxyethylated vegetable oil 0.2 g., Nacconate 80—50 g.
[3] Made by commercial prepolymer formulation: Selectrofoam Resin 6002 (polyester)—58.0 g., Tween 40—1.0 g., 2-dimethylaminoethanol—0.25 g., water—2.75 g., Selectrofoam Prepolymer 6003 (excess diisocyanate) 100.0 g.
[4] 100 C plus 20 g. Al powder filler.
[5] 100 C plus 60 g. Al powder filler.
[6] No unsaturated, non-polyol monomer. Quadrol—70 g., castor oil—30 g., sulfonated petroleum oil—1 g., water—0.5 g., foam stabilizer—6 g., triethanolamine—1 g., Hylene TM—73 g.

EXAMPLE 12

The following test data illustrate the low thermal conductivity and excellent insulation properties of our foamed products.

| Formulation | Density lb./ft.³ | Cell size, appr. avg. mm. | Thermal conductivity B.t.u./hr./ft.²/in./° F. |
|---|---|---|---|
| 108C | 6.04 | 1.0 | 0.295 |
| 108C | 4.33 | 0.8 | 0.282 |
| 100C | 2.58 | 0.8 | 0.266 |
| 100C | 2.50 | 0.8 | 0.257 |

Although this invention has been described with reference to illustrative embodiments thereof, it will be apparent to those skilled in the art that the principles of this invention can be embodied in other forms but within the scope of the claims.

We claim:

1. A foamed polyurethane comprising the reaction product of a polyhydroxy alcohol ester of ricinoleic acid containing at least two ricinoleyl groups and having an equivalent weight in terms of its functional hydroxy groups above 200; a second organic polyol containing at least three functional alcoholic hydroxy groups and having a maximum equivalent weight in terms of its functional hydroxy groups of about 125; an organic polyisocyanate; a polymerizable ethylenically-unsaturated monomer containing at most one reactive hydroxy group; and a foaming agent, said polyhydroxy alcohol ester of ricinoleic acid comprising at least about 10% by weight of the composition, the second polyol comprising at least about 10% by weight of the polyricinoleate, and the ethylenically-unsaturated monomer comprising at least about 5% by weight of the polyhydroxy alcohol ester of ricinoleic acid.

2. The composition of claim 1 in which the second polyol is an aliphatic compound.

3. The composition of claim 2 in which the polyhydroxy alcohol ester of ricinoleic acid is castor oil.

4. The composition of claim 3 in which the polyisocyanate is an aromatic polyisocyanate.

5. The composition of claim 4 which includes in addition an emulsifying agent and foam stabilizer.

6. The composition of claim 4 in which the ethylenically-unsaturated monomer is a vinyl compound.

7. The composition of claim 4 in which the polyisocyanate is present in sufficient amount to contribute isocyanate groups in at least a 1:1 ratio to the functional hydroxy groups in the composition.

8. The composition of claim 6 in which the second polyol is N,N,N',N'-tetrakis-(2-hydroxypropyl)-ethylene diamine.

9. The composition of claim 8 in which the polyisocyanate is tolylene diisocyanate.

10. The composition of claim 8 in which the polyisocyanate is the triisocyanate adduct of hexanetriol and tolylene diisocyanate.

11. The composition of claim 8 in which the vinyl monomer is vinyl toluene.

12. The composition of claim 8 in which the vinyl monomer is diallyl phthalate.

13. The composition of claim 8 in which the vinyl monomer is N,N'-diallyl melamine.

14. The composition of claim 8 in which the vinyl monomer is vinyl stearate.

15. The composition of claim 8 in which the vinyl monomer is triallyl cyanurate.

16. A process for making a foamed polyurethane, comprising admixing a polyhydroxy alcohol ester of ricinoleic acid containing at least two ricinoleyl groups and having an equivalent weight in terms of its functional hydroxy groups above 200 in an amount comprising at least about 10% by weight of the total composition; a second organic polyol containing at least three functional alcoholic hydroxy groups and having a maximum equivalent weight in terms of its functional hydroxy groups of about 125, said second polyol comprising at least about 10% by weight of the polyhydroxy alcohol ester of ricinoleic acid; an organic polyisocyanate; a polymerizable, ethylenically-unsaturated monomer containing at most one reactive hydroxy group, said unsaturated monomer comprising at least about 5% by weight of the polyhydroxy alcohol ester of ricinoleic acid; and a foaming agent; and permitting the mixture to react under the exotherm produced by reaction of said second polyol with said polyisocyanate, polymerization of said ethylenically-unsaturated monomer being thermally induced by said exotherm.

17. The process of claim 16 in which the second polyol is an aliphatic compound.

18. The process of claim 17 in which the polyhydroxy alcohol ester of ricinoleic acid is castor oil.

19. The process of claim 18 in which the polyisocyanate is an aromatic polyisocyanate.

20. The process of claim 19 in which the ethylenically-unsaturated monomer is a vinyl compound.

21. The process of claim 19 in which the polyisocyanate is present in sufficient amount to contribute isocyanate groups in at least a 1:1 ratio to the functional hydroxy groups in the composition.

22. The process of claim 19 in which the second polyol is N,N,N',N'-tetrakis-(2-hydroxypropyl)-ethylene diamine.

23. The process of claim 22 in which the polyisocyanate is tolylene diisocyanate.

24. The process of claim 22 in which the polyisocyanate is the triisocyanate adduct of hexanetriol and tolylene diisocyanate.

25. The process of claim 22 in which the ethylenically-unsaturated monomer is a vinyl compound.

26. The process of claim 25 in which the vinyl monomer is vinyl toluene.

27. The process of claim 25 in which the vinyl monomer is diallyl phthalate.

28. The process of claim 25 in which the vinyl monomer is N,N'-diallyl melamine.

29. The process of claim 25 in which the vinyl monomer is vinyl stearate.

30. The process of claim 25 in which the vinyl monomer is triallyl cyanurate.

References Cited in the file of this patent
UNITED STATES PATENTS

| | | |
|---|---|---|
| 2,609,349 | Cass | Sept. 2, 1952 |
| 2,642,403 | Simon et al. | June 16, 1953 |
| 2,740,743 | Pace | Apr. 3, 1956 |
| 2,772,245 | Simon et al. | Nov. 27, 1956 |
| 2,833,730 | Barthel | May 6, 1958 |
| 2,850,464 | Mitchell | Sept. 2, 1958 |